May 26, 1964     R. R. HANSON     3,134,242

REFRIGERATOR WITH THAWING MEANS

Filed Jan. 15, 1962     2 Sheets-Sheet 1

*INVENTOR.*
ROY R. HANSON
BY *Alfred W. Petcraft*
ATTORNEY

May 26, 1964 R. R. HANSON 3,134,242
REFRIGERATOR WITH THAWING MEANS
Filed Jan. 15, 1962 2 Sheets-Sheet 2

INVENTOR.
ROY R. HANSON
BY Alfred W. Petcheft
ATTORNEY

United States Patent Office  3,134,242
Patented May 26, 1964

3,134,242
REFRIGERATOR WITH THAWING MEANS
Roy R. Hanson, 155 Cumberland Ave., Maryland Heights, Mo., assignor of one-fourth to William H. Anderson, Glencoe, Mo., one-fourth to Joseph H. Schierman, and one-fourth to George A. Blase, both of St. Louis County, Mo.
Filed Jan. 15, 1962, Ser. No. 166,276
6 Claims. (Cl. 62—197)

This invention relates in general to certain new and useful improvements in refrigerating apparatus and, more particularly, to household refrigerators.

In recent years, the availability and utilization of frozen foods for domestic consumption has increased to such a degree that the average housewife will employ some form of frozen food for one or two meals every day. A very large percentage of American homes are equipped with home freezers, in which large quantities of food are held in frozen storage. This practice not only extends to frozen foods which are purchased in the grocery stores, but also to foods which are frozen in the domestic freezer. For example, many housewives will buy large quantities of meats and poultry in a single shopping expedition and freeze these purchases so that they may be stored and used gradually over an extended period of time.

Most types of frozen foods must, of course, be thawed prior to preparation and cooking. Consequently, the average housewife, in planning meals for her family, must remove from her freezer the particular packages or quantities of frozen foods which she intends to use and allow them to thaw for several hours. In the case of meats, such as large steaks and roasts, the thawing period may even be somewhat longer. In fact, it is usually necessary to allow a large turkey to thaw for as long as eight to ten hours.

The protracted thawing periods which are usually required, result in many difficult problems. If, for example, the housewife forgets to remove the desired articles of frozen food from the freezer sufficiently in advance of meal-time, it may not be possible to prepare the particular meal which she has planned or intended. Similarly, some unanticipated emergency, such as the arrival of an unexpected dinner guest, may impel the housewife to prepare foods other than those originally planned. For such circumstances, it is usually impossible to rely upon frozen foods which may be on hand in the freezer, since there is not sufficient time to permit such foods to thaw out to a sufficient degree so as to be cooked.

It is, therefore, the primary object of the present invention to provide a household refrigerator having a compartment which can be readily maintained at a suitably elevated temperature in order to facilitate and accelerate the thawing of frozen foods placed therein.

It is also an object of the present invention to provide, within the insulated walls of the food storage chamber of a refrigerator cabinet, an auxiliary compartment which is heated by elements of the refrigerating system forming a part of such refrigerator.

It is an additional object of the present invention to provide a household refrigerator having a thawing compartment of the type stated which will operate automatically in response to the condition of the frozen foods placed therein and will quickly thaw out such frozen foods, rendering them suitable for culinary preparation and ultimate cooking.

It is a further object of the present invention to provide a household refrigerator of the type stated in which the refrigerating system is utilized to heat an auxiliary frozen food thawing compartment while the refrigerating system operates to maintain a low temperature in the general food storage compartment of the refrigerator.

With the above and other objects in view, my invention resides in the novel features of form, construction, arrangement, and combination of parts presently described and pointed out in the claims.

In the accompanying drawings—

Figure 1:
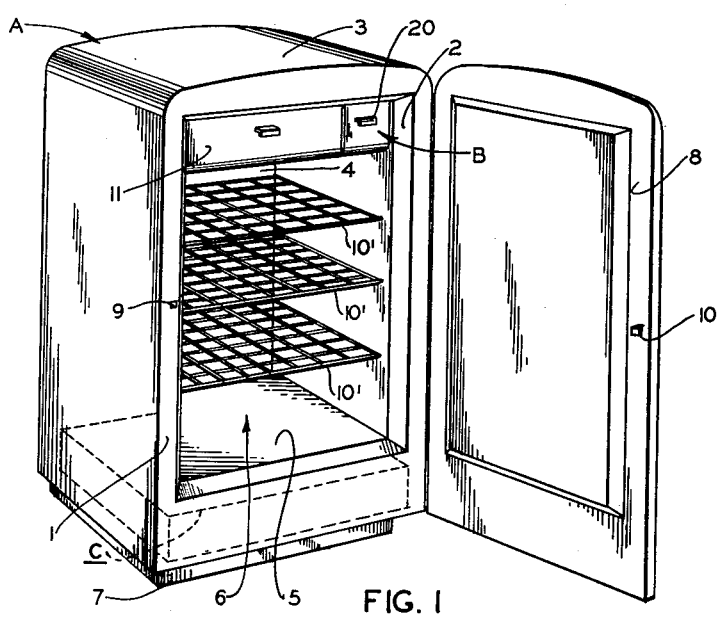
FIG. 1 is a perspective view of a household refrigerator constructed in accordance with and embodying the present invention.
Figure 3:
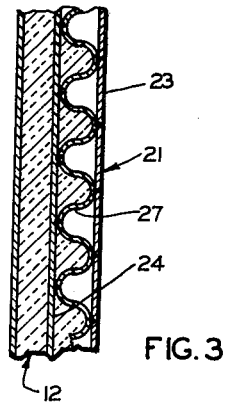
Figure 2:
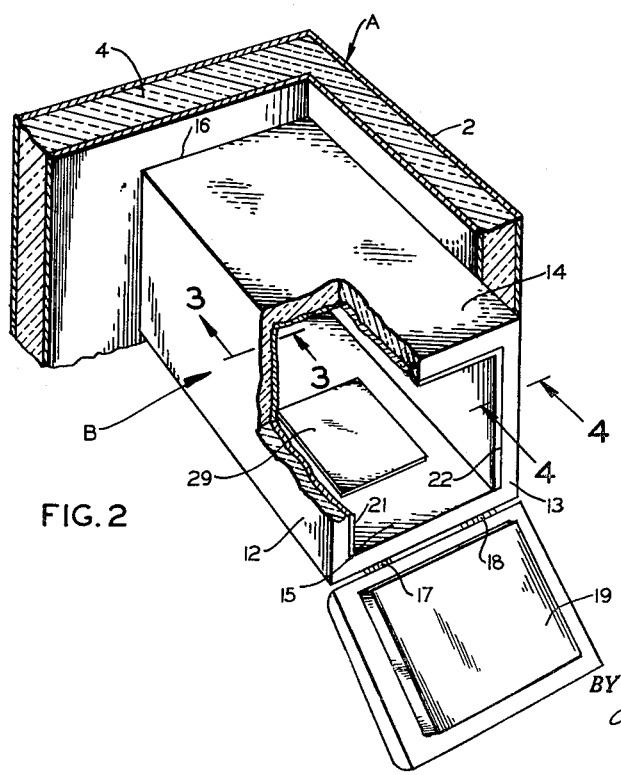
FIG. 2 is a fragmentary perspective view, partly broken away and in section, of frozen food thawing compartment forming a part of the present invention.
Figure 4:
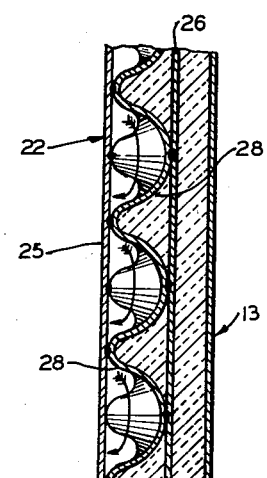
Figure 5:
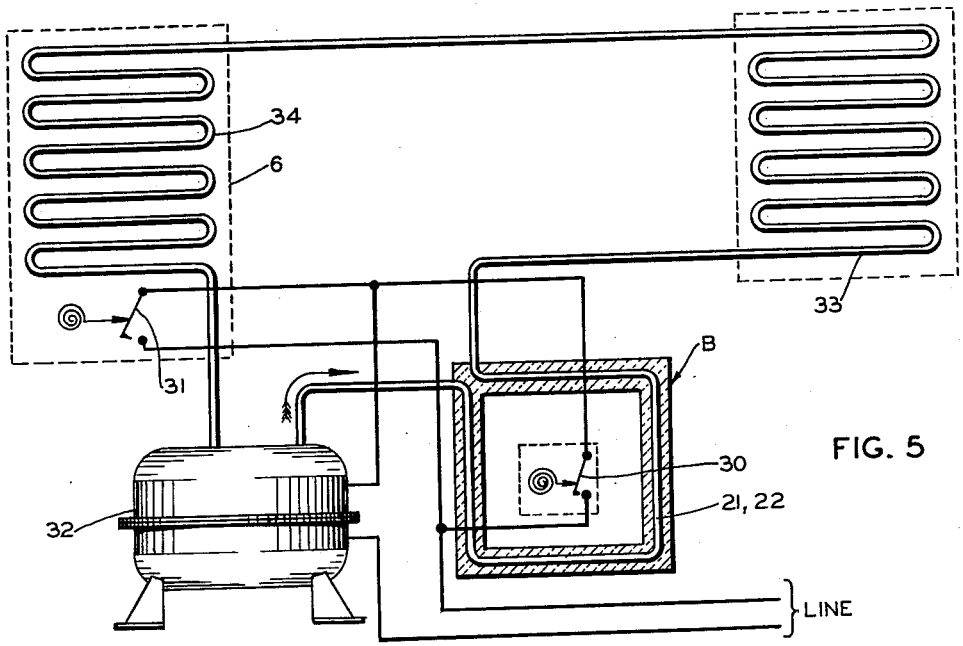
Figure 6:
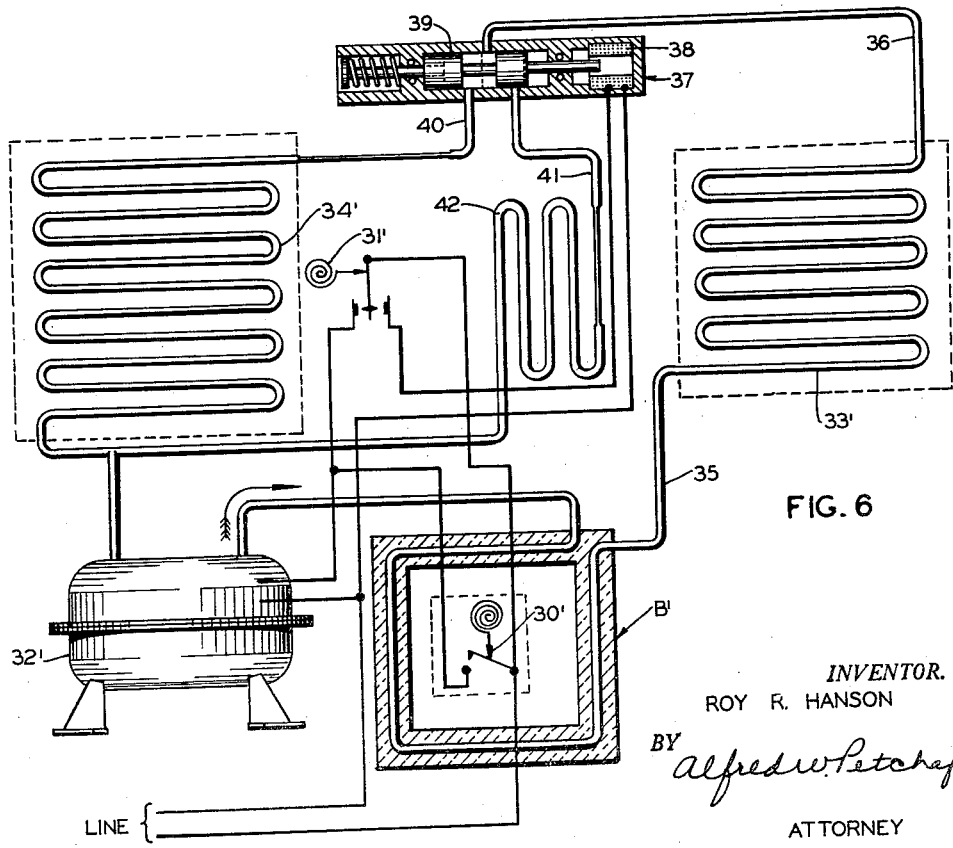

FIGS. 3 and 4 are fragmentary sectional views taken along lines 3—3 and 4—4, respectively, of FIG. 2;

FIG. 5 is a diagrammatic view of the refrigerating system forming a part of the present invention; and FIG. 6 is a diagrammatic view of a modified form of refrigerating system also forming a part of the present invention.

Referring now in more detail and by reference characters to the drawings, which illustrate practical embodiments of the present invention, A designates a household refrigerator which includes a rectilinear cabinet having insulated side walls 1, 2, a top wall 3, a rear wall 4, and a bottom wall 5, which are conventionally joined to form an open-faced enclosure or food storage chamber 6. The bottom wall 5 is located at a somewhat elevated position above the floor-contacting or supporting base 7, so as to provide a concealed sub-compartment c in which the essential components of the refrigerating system may be located. Hingedly mounted along the forward margin of the side wall 2 is an insulated door 8, which swings into closure-forming position across the front face of the chamber 6 and is conventionally held in closed position by a detent 9 and a conventional refrigerator door lock 10. Suitably disposed, within the chamber 6 in any conventional manner, are a plurality of shelves 10', upon which food and other comestibles may be placed when the refrigerator A is in actual use. Also provided for use with the refrigerator A, in the conventional manner, is a freezer compartment 11 which may be used for storage of small quantities of frozen foods and for freezing ice cubes or similar purposes.

Mounted within the interior of the chamber 6 preferably in the upper portion thereof is a thawing compartment generally designated by the reference character B and including side walls 12, 13, a top wall 14, a bottom wall 15 and a rear wall 16, all made of diathermanous material or construction so that the interior of the thawing compartment B will be thermally insulated from the compartment 6.

Hingedly mounted, preferably upon the forward margin of the bottom wall 15, by means of hinges 17, 18, is a thermally insulated door 19 which fits snugly across the forward end of the compartment B. For convenience, the door 19 is provided upon its front face with a small handle 20 and it should also be noted in this connection that the hinges 17, 18, are preferably of some conventional spring-biased type so that the door 19 will ordinarily be swung upwardly into closed position.

Formed integrally as a part of the interior faces of the side walls 12, 13, are plates 21, 22, which consist of spaced parallel sheet metal walls 23, 24, and 25, 26, respectively. The sheet metal walls 23, 24, are held in spaced parallel relation by an interior corrugated or convoluted mid-wall 27, which is spot-welded to the walls 23, 24, and forms a series of interconnected passageways or ducts through which refrigerant fluid may flow and evaporate. Similarly, the walls 25, 26, are held in spaced parallel relation by a corrugated or convoluted mid-wall 28, which is substantially similar in form and construction to the wall 27 and serves the same purpose of sub-dividing the space between the walls 25, 26, into passageways or ducts through which hot compressed refrigerant may flow and give off heat.

Mounted upon the inner and upwardly presented face of the bottom wall 15 is a flat plate 29 which is provided on its under face with a thermostatically operated single-pole, single-throw switch 30, which is connected in parallel with the conventional thermostatic switch 31 normally associated with a household refrigerator system. Ordinarily, in household refrigerators, the main thermostat, such as the thermostat 31, will be located within the main storage compartment 6 and is either pre-set to close when the temperature in the compartment 6 rises above a certain established upper limit or may be adjustable, as is commonly the case, so that the upper limit can be varied as necessity requires.

The plates 21, 22, are connected in series with a compressor 32, a condenser coil 33, and the main evaporator coil or cooling coil 34, as diagrammatically shown in FIG. 5. Thus, whenever the compressor 32 is turned on, the hot compressed gases will flow outwardly therefrom in the direction of the arrow (reference being made to FIG. 5), and circulate through the plates 21, 22, and thence flow through the condenser 33 to the coiling coil 34, it being understood that the condensed refrigerant flowing from the condenser 33 to the evaporator 34 will pass through either a conventional capillary tube or expansion valve, depending up the type of refrigeration system employed. Actually, most modern household refrigerators employ a capillary tube, rather than expansion valve, but, in any case, this is a conventional matter which is common practice in the refrigerator industry at the present time and does not, in and of itself, have any bearing upon the present invention.

The hot compressed gases will, of course, warm the interior of the thawing compartment B, but the temperature therein will not adversely affect the temperature within the compartment 6, since the thawing compartment B is thoroughly and well insulated. It will be noted that whenever the compressor is turned on through the closing of the thermostatic switch 31, the interior of the chamber 6 will be cooled and at the same time the interior of the thawing compartment B will be warmed. Thus, when the package of frozen food is placed into the thawing compartment B, it will be thawed out very rapidly. It is, of course, apparent that the main thermostat 31 will not always be closed, inasmuch as the main storage compartment 6 will frequently reach the desired lower limit of temperature and the thermostatic switch will operate to shut off the compressor 32. However, when an article of frozen food, such as a frozen food package or a piece of frozen meat, is placed within the thawing compartment B and laid upon the plate 29, the thermostat 30 will become chilled and will close responsive to the reduced temperature, bypassing the thermostatic switch 31 and turning the compressor on. As long as the frozen article within the thawing compartment B is relatively cold, the thermostat 30 will remain closed and the compressor 32 will operate. The cooling coil 34 will, of course, operate also and the interior of the compartment 36 will be cooled somewhat below the ordinary low limit of temperature maintained by the thermostatic switch 31. Actual experience has shown, however, that the resulting reduction in temperature within the compartment 6 is only a matter of a few degrees and is not significant.

It is also possible to provide a modified form of refrigerating system such as that shown in FIG. 6, which includes a main thermostatic switch 31′, a compressor 32′, a condenser 33′, and an evaporator or cooling coil 34′, all substantially similar to the previously described switch 31, compressor 32, condenser 33, and evaporator or cooling coil 34. Also included within the modified form of refrigerating system is a thawing compartment B′, which is substantially similar to the previously described thawing compartment B and includes an auxiliary thermostatic switch 30′, which is also similar to the previously described thermostatic switch 30. The thawing compartment B′ is connected by a refrigerant line 35 directly to the condenser 33′. However, the condenser 33′ is connected by a refrigerant line 36 through a solenoid operated three-way valve 37. This valve 37 may be of any conventional construction and it is sufficient for present purposes to indicate that it includes a driving coil 38 and a mechanically operated internal valve body 39, which, when in the position shown in full lines in FIG. 6, will establish a connection through the valve 37 between the refrigerant line 36 and a refrigerant line 40, which leads to the evaporator 34′. When the valve 37 is in its alternative position, that is to say, the position indicated by the dotted lines in FIG. 6, a by-pass connection is established between the refrigeration line 36 and a refrigerant line 41, which runs directly back to the compressor 32′. The switches 30′, 31′, and the driving coil 38 of the three-way valve 37, are electrically connected in circuit with the compressor, as shown in FIG. 6. Thus, whenever the compressor is operating responsive to closure of the switch 31′, the main storage compartment of the refrigerator will be cooled by the cooling coil 34′ and the interior of the thawing compartment B will be warmed by the hot compressed gases flowing from the compressor 32′ to the condenser 33′.

If, however, the interior of the refrigerator is sufficiently cool, at a time when the auxiliary control switch 30′ is closed responsive to the placement of a frozen food package within the thawing compartment B, then the driving coil 38 will be energized so as to shift the valve from the position shown in full lines to the position shown in dotted lines in FIG. 6, and the compressor 32′ will operate, but the condensed refrigerant gas flowing out of the condenser 33′ will bypass the evaporator or cooling coil 34′ and will return to the compressor through the refrigerant line 41. As a safety measure, in order to prevent liquid refrigerants from returning to the compressor 32′ and damaging it, an auxiliary evaporator coil 42 is interposed in the bypass line 41 and this evaporator coil 42 is mounted in some suitable location on the outside of the icebox, so as to be affected by ambient temperature. Whenever the bypass circuit is in operation, of course, this auxiliary evaporator coil 42 will tend to condense moisture from the atmosphere and may even frost up slightly, but it is conventional practice to mount such a coil over a suitable catch-pan of some sort so that any condensate or frost which later may melt will be caught and suitably disposed of, preferably by being allowed to drip over the hot condenser coil 33′. These latter expedients are conventional practice in the refrigerator industry and, therefore, are not specifically shown and described herein. Actual practice has shown that the hot compressed gases passing through the thawing compartment B′ will warm it up so quickly and will operate to thaw the frozen food placed therein in such a short period of time that the auxiliary coil 42 will be in use for only a very short period of time even when the bypass circuit is in operation.

It should be understood that changes and modifications in the form, construction, arrangement, and combination of the several parts of the refrigerating apparatus may be made and substituted for those herein shown and described without departing from the nature and principle of my invention.

Having thus described my invention, what I claim and desire to secure by Letters Patent is:

1. A refrigerator comprising a cabinet having an insulated food-storage compartment, an evaporator disposed in heat-exchange relationship within the food-storage compartment, a compressor and condenser operatively mounted exteriorly of the food-storage compartment and connected to the evaporator in a refrigeration cycle, an insulated thawing compartment disposed within the food-storage compartment, manually operable closure means on the thawing compartment to provide access thereto while isolating the interior of the thawing compartment from the food-storage compartment, a heat-exchange coil within the thawing compartment in heat-exchange relationship with the interior thereof, and a valve operatively interposed between the condenser, the evaporator and the heat-exchange coil for optionally by-passing the evaporator and establishing a hot-gas circuit between the compressor, the heat-exchange coil and condenser.

2. A refrigerator comprising a cabinet having an insulated food-storage compartment, an evaporator disposed in heat-exchange relationship within the food-storage compartment, a compressor and condenser operatively mounted exteriorly of the food-storage compartment and connected to the evaporator in a refrigeration cycle, an insulated thawing compartment disposed within the food storage compartment, manually operable closure means on the thawing compartment to provide access thereto while isolating the interior of the thawing compartment from the food-storage compartment, a heat-exchange coil within the thawing compartment in heat-exchange relationship with the interior thereof, said heat-exchange coil being connected in series with the condenser and compressor and located between said condenser and compressor so as to be heated by the hot compressed gases that come directly thereto from the compressor, a thermostat in the food-storage compartment for turning on the compressor when the temperature of the food-storage compartment rises above a predetermined level, and thermostatic means in the thawing compartment in parallel with the thermostat in the food-storage compartment for starting the compressor whenever the temperature in the thawing compartment drops below a predetermined limit, said hot compressed gases providing a large temperature differential between the frozen food package and the interior of the heat-exchange coil so as to provide rapid thawing of said package.

3. A refrigerator comprising a cabinet having an insulated food-storage compartment, an evaporator disposed in heat-exchange relationship within the food-storage compartment, a compressor and condenser operatively mounted exteriorly of the food-storage compartment and connected to the evaporator in a refrigeration cycle, an insulated thawing compartment disposed within the food-storage compartment, manually operable closure means on the thawing compartmnet to provide access thereto while isolating the interior of the thawing compartment from the food-storage compartment, a heat-exchange coil within the thawing compartment in heat-exchange relationship with the interior thereof, a valve operatively interposed between the condenser, the evaporator and the heat-exchange coil for optionally by-passing the evaporator and establishing a hot-gas circuit between the compressor, the heat-exchange coil and condenser, and means for operating the valve to by-pass the evaporator whenever the thawing compartment temperature rises above a limit while the temperature of the food-storage compartment is below a limit.

4. A refrigerator comprising a cabinet having an insulated food-storage compartment, an evaporator disposed in heat-exchange relationship within the food-storage compartment, a compressor and condenser operatively mounted exteriorly of the food-storage compartment and connected to the evaporator in a refrigeration cycle, an insulated thawing compartment disposed within the food-storage compartment, manually operable closure means on the thawing compartment to provide access thereto while isolating the interior of the thawing compartment from the food-storage compartment, a heat-exchange coil within the thawing compartment in heat-exchange relationship with the interior thereof, a valve operatively interposed between the condenser, the evaporator and the heat-exchange coil for optionally by-passing the evaporator and establishing a hot-gas circuit between the compressor, the heat-exchange coil and condenser, a first thermostat in the food-storage compartment for starting the compressor when the temperature of the food-storage compartment rises above a limit, a second thermostat for starting the compressor when the temperature of the thawing compartment drops below a limit, and actuating means associated with the valve and with the first thermostat for shifting the valve out of by-passing position and into a position for connecting the evaporator in the hot-gas circuit responsive to actuation of the first thermostat.

5. A refrigerator comprising a cabinet having an insulated food-storage compartment, an evaporator disposed in heat-exchange relationship within the food-storage compartment, a compressor and condenser operatively mounted exterior of the food-storage compartment and connected to the evaporator in a refrigeration cycle, an insulated thawing compartment disposed within the food-storage compartment, manually operable closure means on the thawing compartment to provide access thereto while isolating the interior of the thawing compartment from the food-storage compartment, a heat-exchange coil within the thawing compartment in heat-exchange relationship with the interior thereof, a valve operatively interposed between the condenser, the evaporator and the heat-exchange coil for optionally by-passing the evaporator and establishing a hot-gas circuit between the compressor, the heat-exchange coil and condenser, means for normally biasing the valve into by-passing position, a first thermostat in the food-storage compartment for starting the compressor when the temperature of the food-storage compartment rises above a limit, a second thermostat for starting the compressor when the temperature of the thawing compartment drops below a limit, and actuating means associated with the valve and with the first thermostat for shifting the valve out of by-passing position and into a position for connecting the evaporator in the hot-gas circuit responsive to actuation of the first thermostat.

6. A refrigerator comprising a cabinet having an insulated food-storage compartment, an evaporator disposed in heat-exchange relationship within the food-storage compartment, a compressor and condenser operatively mounted exteriorly of the food storage compartment and connected to the evaporator in a refrigeration cycle, an insulated thawing compartment disposed within the food storage compartment, manually operable closure means on the thawing compartment to provide access thereto while isolating the interior of the thawing compartment from the food-storage compartment, said thawing compartment including at least one wall which is formed by three spaced parallel plates of which one is an interior plate, and a convoluted midwall interposed between the interior plate and the other two spaced parallel plates thereby forming a plurality of heat-exchange ducts which are in heat-exchange relationship with the interior of said thawing compartment, said heat-exchange ducts being connected in series with the condenser and compressor and located between said condenser and compressor so as to be heated by the hot compressed gases that come directly thereto from the compressor.

References Cited in the file of this patent

UNITED STATES PATENTS

| | | |
|---|---|---|
| 2,317,816 | Scott | Apr. 27, 1943 |
| 2,324,649 | Smith | July 20, 1943 |
| 2,412,774 | Hoffman | Dec. 17, 1946 |
| 2,467,464 | Carrier | Apr. 19, 1949 |
| 2,568,653 | Mojonnier | Sept. 18, 1951 |
| 2,597,745 | Morrison | May 20, 1952 |

FOREIGN PATENTS

| | | |
|---|---|---|
| 804,490 | Great Britain | Nov. 19, 1958 |